(12) United States Patent
Livyatan et al.

(10) Patent No.: US 9,729,858 B2
(45) Date of Patent: Aug. 8, 2017

(54) STEREO AUTO-CALIBRATION FROM STRUCTURE-FROM-MOTION

(71) Applicant: MOBILEYE VISION TECHNOLOGIES LTD., Jerusalem (IL)

(72) Inventors: Harel Livyatan, Modi'in (IL); Oded Berberian, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 15/280,117

(22) Filed: Sep. 29, 2016

(65) Prior Publication Data

US 2017/0019657 A1    Jan. 19, 2017

Related U.S. Application Data

(63) Continuation of application No. 14/554,544, filed on Nov. 26, 2014.
(Continued)

(51) Int. Cl.
*H04N 13/02* (2006.01)
*H04N 13/04* (2006.01)
(Continued)

(52) U.S. Cl.
CPC .......... *H04N 13/0246* (2013.01); *B60R 1/00* (2013.01); *B60R 11/04* (2013.01); *G06K 9/00791* (2013.01); *G06K 9/6201* (2013.01); *G06T 7/579* (2017.01); *G06T 7/85* (2017.01); *H04N 5/3532* (2013.01); *H04N 13/0239* (2013.01); *H04N 13/0271* (2013.01); *B60R 2011/0026* (2013.01); *B60R 2300/105* (2013.01); *B60R 2300/402* (2013.01); *G06T 2207/30252* (2013.01); *H04N 2013/0081* (2013.01)

(58) Field of Classification Search
USPC ....................................................... 348/47–52
See application file for complete search history.

(56) References Cited

U.S. PATENT DOCUMENTS

| | | | | |
|---|---|---|---|---|
| 6,118,475 A * | 9/2000 | Iijima | ................... | G01C 11/06 348/42 |
| 9,053,562 B1 * | 6/2015 | Rabin | .................... | G06T 19/00 |

(Continued)

*Primary Examiner* — Nigar Chowdhury
(74) *Attorney, Agent, or Firm* — Finnegan, Henderson, Farabow, Garrett & Dunner LLP (57) ABSTRACT

Auto-calibration of stereo cameras installable behind the windshield of a host vehicle and oriented to view the environment through the windshield. Multiple first image points are located of one of the first images captured from the first camera at a first time and matched with first image points of at least one other of the first images captured from the first camera at a second time to produce pairs of corresponding first image points respectively in the first images captured at the different times. World coordinates are computed from the corresponding first image points. Second image points in the second images captured from the second camera are matched to at least a portion of the first image points. The world coordinates as determined from the first camera are used, to solve for camera parameters of the second camera from the matching second image points of the second camera.

21 Claims, 3 Drawing Sheets

Related U.S. Application Data

(60) Provisional application No. 61/908,831, filed on Nov. 26, 2013.

(51) Int. Cl.
| | |
|---|---|
| *B60R 1/00* | (2006.01) |
| *H04N 5/353* | (2011.01) |
| *G06T 7/80* | (2017.01) |
| *G06T 7/579* | (2017.01) |
| *B60R 11/04* | (2006.01) |
| *G06K 9/00* | (2006.01) |
| *G06K 9/62* | (2006.01) |
| *H04N 13/00* | (2006.01) |
| *B60R 11/00* | (2006.01) |

(56) References Cited

U.S. PATENT DOCUMENTS

| | | |
|---|---|---|
| 2015/0294505 A1 | 10/2015 | Atsmon |
| 2016/0054452 A1 | 2/2016 | Cosatto |
| 2016/0070102 A1 | 3/2016 | Takamatsu |
| 2016/0073098 A1 | 3/2016 | Villalobos |

* cited by examiner

STEREO AUTO-CALIBRATION FROM STRUCTURE-FROM-MOTION

CROSS REFERENCE TO RELATED APPLICATIONS

This application is a continuation of and claims the benefit of priority of U.S. patent application Ser. No. 14/554,544, filed Nov. 26, 2014 (now allowed), which claims the benefit of priority from of U.S. Provisional Patent Application No. 61/908,831, filed on Nov. 26, 2013 by the same inventors, the disclosure of each of which is included herein by reference in its entirety.

BACKGROUND

1. Technical Field

The present disclosure relates to a method for calibration stereo cameras and in particular for use inside a vehicle as part of a driver assistance system.

2. Description of Related Art

Stereo vision is the process of recovering depth from camera images by comparing two or more views of the same scene. Binocular stereo uses two images, taken with cameras that are separated by a horizontal distance known as the "baseline". Calibrating the stereo camera system allows computation of three-dimensional world points in actual units, e.g. millimeters, relative to the cameras based on the image coordinates.

Calibration of a stereo camera system involves the estimation of extrinsic parameters which describe translation and rotation of the second camera relative to the first camera and intrinsic parameters of each camera. Intrinsic parameters include focal lengths, principal points and other parameters which describe camera image distortion. Image distortion means that image points are displaced from the position predicted by an ideal pinhole projection model. The most common form of distortion is radial distortion, which is inherent in all single-element lenses. Under radial distortion, e.g. pincushion distortion and/or barrel distortion, image points are displaced in a radial direction from the image center.

Different sources of information can be used to obtain camera calibration. One approach (sometimes called "off-line" calibration) is to use a known target where the three-dimensional world coordinates (or locations in three-dimensional space) of respective multiple points are known. One such option may use a checkerboard with known square size at a known location in world coordinates. Such calibration techniques require special equipment and/or a special procedure that is time consuming and costly.

Cameras for use in driver assistance and/or driving control may be mounted viewing in the forward direction inside a vehicle behind the windshield. Stereo calibration for stereo cameras mounted behind the windshield is thus further complicated; since the windshield distorts the perspective or camera projection, the calibration may be performed only after installing the cameras in the host vehicle. Cameras are generally modeled using the pinhole camera model using perspective projection. This model is a good approximation to the behavior of most real cameras, although in some cases it can be improved by taking non-linear effects (such as radial distortion) into account.

Auto-calibration or self-calibration refers to a technique in which the camera parameters are updated "on-line" by processing images being captured during motion of the vehicle. In automotive applications, auto-calibration may insure maintenance-free long-term operation, since camera parameters may be subject to drift due mechanical vibrations or large temperature variations that are commonly encountered in automotive applications. Additionally, reliable auto-calibration techniques may render obsolete initial off-line calibration, thus reducing time and cost in the production line.

Thus there is a need for and it would be advantageous to have a method for auto-calibration stereo cameras suitable for driver assistance and or driving control applications in automobiles.

Structure-from-Motion (SfM) refers to methods for recovering three-dimensional information of a scene that has been projected onto the back focal plane of a camera. The structural information derived from a SfM algorithm may take the form of a set of projection matrices, one projection matrix per image frame, representing the relationship between a specific two-dimensional point in the image plane of the camera and its corresponding three-dimensional point in world space. Alternatively, the structure information is the depth or distance to the three-dimensional (3D) point $P=(X, Y, Z)$ which projects onto the image plane at the two-dimensional (2D) point $p=(x,y)$. SfM algorithms rely on tracking specific image features from image frame to image frame to determine structural information concerning the scene.

Structure-from-Motion (SfM) techniques useful in driver assistance applications have been previously disclosed by the present Applicant in US patent application publication 2014/0160244 entitled: Monocular Cued Detection of three-dimensional Structures from Depth Images, which is included herein by reference. US patent application publication 2014/0160244 discloses a system mountable in a host vehicle including a camera connectable to a processor. Multiple image frames are captured in the field of view of the camera. In the image frames, an imaged feature is detected of an object in the environment of the vehicle. The image frames are portioned locally around the imaged feature to produce imaged portions of the image frames including the imaged feature. The image frames are processed to compute a depth map locally around the detected imaged feature in the image portions. The depth map may be represented by an image of the feature with a color or grayscale coordinate related to a function of distance from the camera to the object. Using the camera projection and known camera intrinsic and extrinsic parameters relative to a world coordinate system, the depth map is sufficient to provide the three-dimensional world coordinates of the imaged feature.

The computation of depth maps from multiple images, either from a motion time sequence and/or from multiple cameras is the subject of extensive research and numerous systems have been demonstrated.

BRIEF SUMMARY

Various systems and methods are disclosed herein for auto-calibration of stereo cameras including a first camera and second camera installable behind the windshield of a host vehicle and oriented to view the environment through the windshield, and a processor connectable to the stereo cameras. The processor during motion of the host vehicle captures multiple series of images respectively from the stereo cameras including a first time series of first images from the first camera and a second time series of second images from the second camera. The processor locates multiple first image points of at least one of the first images captured from the first camera at a first time and matches at least a portion of the first image points with first image points of at least one other of the first images captured from the first camera at a second time to produce pairs of corresponding first image points respectively in the first images captured at the different times. Responsive to the motion of the host vehicle, the processor computes world coordinates from the pairs of corresponding first image points of at least two of the first images captured at the different times from the first camera. The processor matches multiple second image points from the second camera to corresponding first image points from the first camera. Matching may be constrained to epipolar lines. The world coordinates of at least a portion of the first image points are then used to solve for multiple camera parameters of the second camera. The solution of the camera parameters of the second camera will then predict a depth map based on stereo disparity consistent with the world coordinates computed from the first images responsive to the motion of the host vehicle. The processor may re-compute the camera parameters of the second camera with an initial estimate of the center of distortion of the second camera to compute further camera parameters including radial distortion parameters of the second camera. Alternatively, the radial distortion parameters may be computed together with the camera matrix of the second camera. The processor may perform the auto-calibration while correcting for further distortion caused by the first camera and the second camera having rolling shutters. The world coordinates may be used as constraints which correspond to the times when the picture elements of the first and second image points are actually captured.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are based on the following concept: A pair of stereo cameras is installed behind the windshield of a host vehicle. The forward motion, distance in meters, of the host vehicle may be known from sensors in the vehicle through the CAN bus. While moving, multiple images from a camera, e.g. one of the two stereo cameras, are used to recover three-dimensional world coordinate information of number of world points using Structure from Motion (SfM) techniques. SfM thus provides a three-dimensional coordinates (X,Y,Z) of world points in the image. This information is then used to compute the camera parameters of the second camera, and in particular at least some of the intrinsic and/or extrinsic parameters. Calibration parameters thus determined generate stereo disparity that gives three-dimensional world coordinate information, e.g distance or depth Z that complies with the three-dimensional world coordinate information previously computed from SfM.

The resulting solution is a robust depth estimation that merges both spatial and temporal depth estimation algorithms Following camera calibration, the depth from stereo disparity may be used to augment the depth from SfM in particular in situations that are difficult for SfM such as when the host vehicle is stationary or when there are multiple moving objects in the scene.

Figure 1:
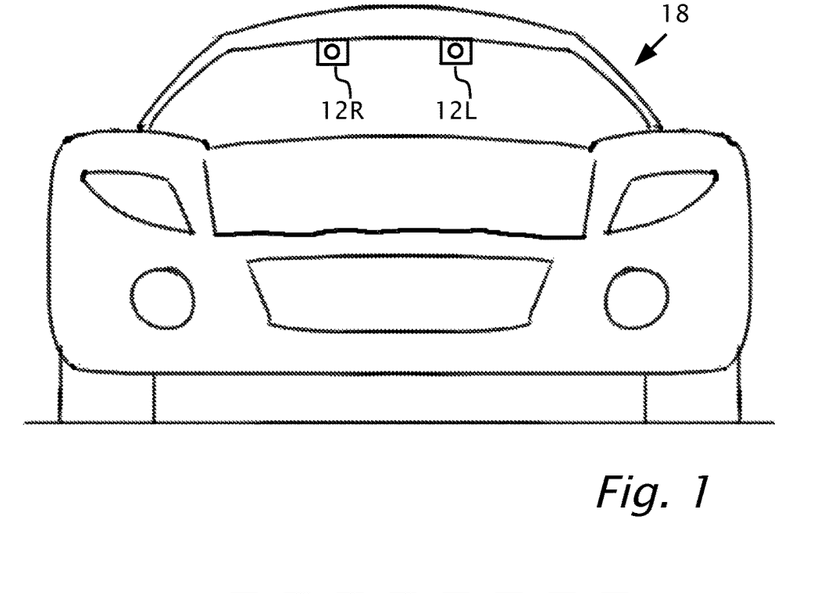
FIG. 1 illustrates stereo cameras installed behind the windshield of a host vehicle, according to embodiments of the present invention.
Figure 2:
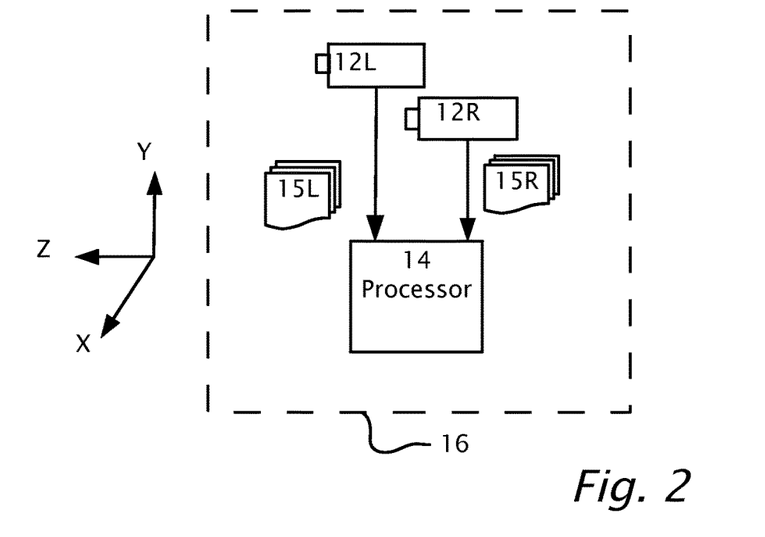
FIG. 2 is a schematic block diagram of a driver assistance and or driving control system installed in the host vehicle according to embodiments of the present invention.

Referring now to the drawings, reference is now made to FIG. 1 which illustrates stereo cameras, left camera 12L and right camera 12R installed behind the windshield of vehicle 18 and viewing the road environment substantially in the Z direction in world coordinates, the forward direction of vehicle 18. Reference is now also made to FIG. 2, which is a schematic block diagram of a driver assistance and or driving control system 16 installed in vehicle 18.

A time series of image frames 15L is being captured by a processor 14 from the left camera and a second time series of image frames 15R is being captured by processor 14.

Figure 3:
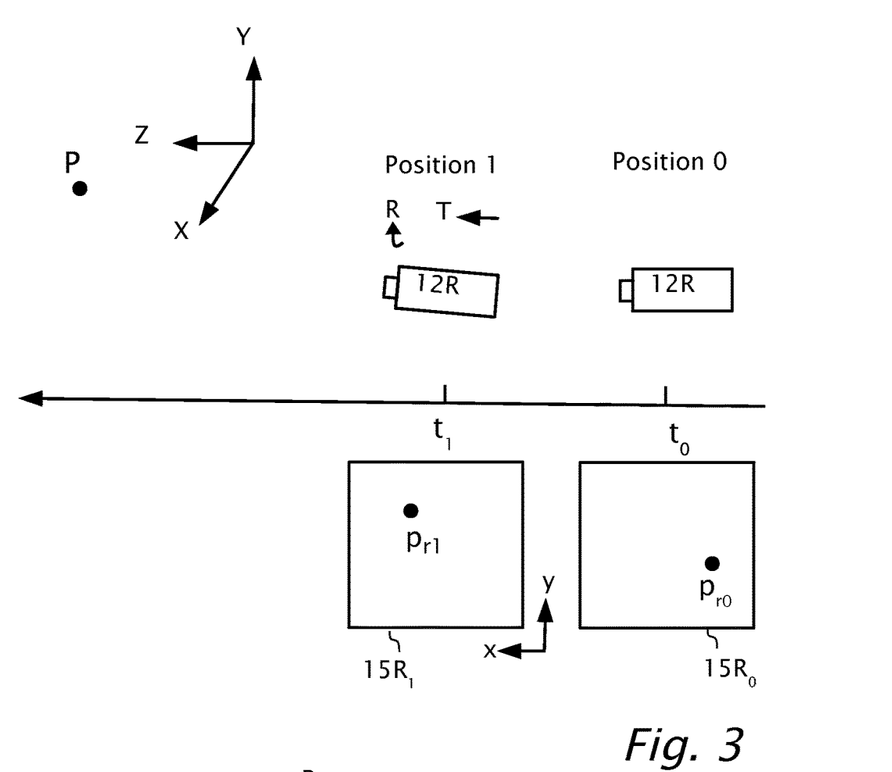
FIG. 3 illustrates schematically a structure-from-motion (SfM) algorithm as used in embodiments of the present invention.

Reference is now also made to FIG. 3 which illustrates schematically a structure-from-motion (SfM) algorithm as used in embodiments of the present invention. One of the two stereo cameras, in the example stereo camera 12R, is shown in two positions, along a road and installed in vehicle 18. A time axis is shown on which camera 12R is shown in position 0 at time $t_0$ and later in position 1 at time $t_1$. An image frame $15R_0$ is shown schematically which is captured at time $t_0$ by right camera 12R and a second image frame $15R_1$ captured at time $t_1$. A world Cartesian coordinate system (X,Y,Z) is shown. At position 1 right camera 12R is translated by a vector T and rotated by a matrix R relative to right camera 12R at position 0. A world point P is shown. World point P is imaged respectively at image point $p_{r0}$ and at image point $p_{r1}$ in both image frame $15R_0$ and image frame $15R_1$.

In the SfM algorithm, multiple, e.g. 6-20 matching image point pairs located in the two image frames $15R_0$ and $15R_1$ respectively may be required. The matching image points $p_{r0}, p_{r1}$ are images of multiple object points in the environment. The matching image point pair $p_{r0}, p_{r1}$ as shown as shown in FIG. 3 is just one example.

R is a 3×3 rotation matrix that represents camera orientation and T is a three vector that represents camera translation, of the position of the world origin O in the right camera coordinate system which is translated. Together, these are known as camera extrinsic parameters and describe camera pose.

Translation vector T and rotation matrix R are suitably parameterized and the parameters may be determined from the matching image points $p_{r0}, p_{r1}$ so that with a sufficient number of matching image point pairs, the parameters of translation vector T and rotation matrix R of right camera 12R may be determined under the assumptions of the pinhole projection The 3D world coordinates (X,Y,Z) for each object point P may be computed from the corresponding points in the two images and the translation vector T and rotation matrix R using a variety of methods known in the art. Thus, the real world coordinates (X,Y,Z) for each object point P may be determined from the SfM algorithm using a single camera 12R.

The 3D point P projects to 2D point in the image of right camera 12R. For simplicity the world coordinate system may be aligned with the right camera resulting in extrinsic camera parameters: M=[I;0] and intrinsic camera parameters may be obtained using nominal lens parameters for focal length and lens distortion. Alternatively the intrinsic parameters of the right camera might be obtained using a calibration pattern.

Figure 4:
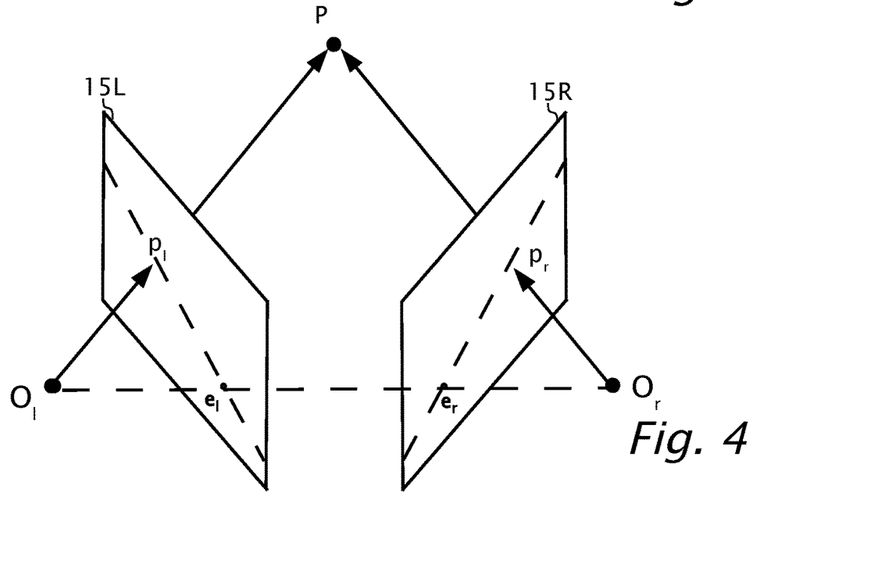
FIG. 4 illustrates epipolar geometry of the stereo cameras.

Reference is now made to FIG. 4 which illustrates epipolar geometry of cameras 12L and 12R. World point P is shown, for instance, the same point P as shown in FIG. 3, in which camera 12R is used to determine world coordinates using an SfM algorithm. In the epipolar geometry as shown, cameras 12L and 12R are modeled using pinhole projection. The pinhole of left camera 12L is at origin $O_l$ which is the origin of the world coordinate system of left camera 12L. The pinhole of right camera 12R is at origin $O_r$ which is the origin of the world coordinate system of right camera 12R. Image planes 15R and 15L are shown in perspective view. Note that the image plane as shown here in front of the optical origins $O_l$, $O_r$ or pinholes. In a real camera, the image planes 15R and 15L would be behind the pinholes, and the images would be inverted. Image points $p_r$ and $p_l$ of world object point P are shown respectively in image planes 15L and 15R respectively. The focal lengths (not shown) of cameras 12L and 12R are given by the distance between the respective origins $O_l$, $O_r$ to image planes 15L and 15R. The perpendicular to image planes 15L and 15R to the respective origins $O_l$, $O_r$ defines the principal rays (not shown) and the principal points (not shown) in image planes 15L and 15R at the points of intersection with the principal rays. The plane formed by origins $O_l$, $O_r$ and world point P is the epipolar plane with respect to world point P. The epipolar lines are shown in image planes 15R and 15L intersecting the epipolar plane $O_l O_r P_i$. The epipoles $e_l$ and $e_r$ are the points of intersection between epipolar lines and the line between the points $O_l$, $O_r$ of origin.

Figure 5:
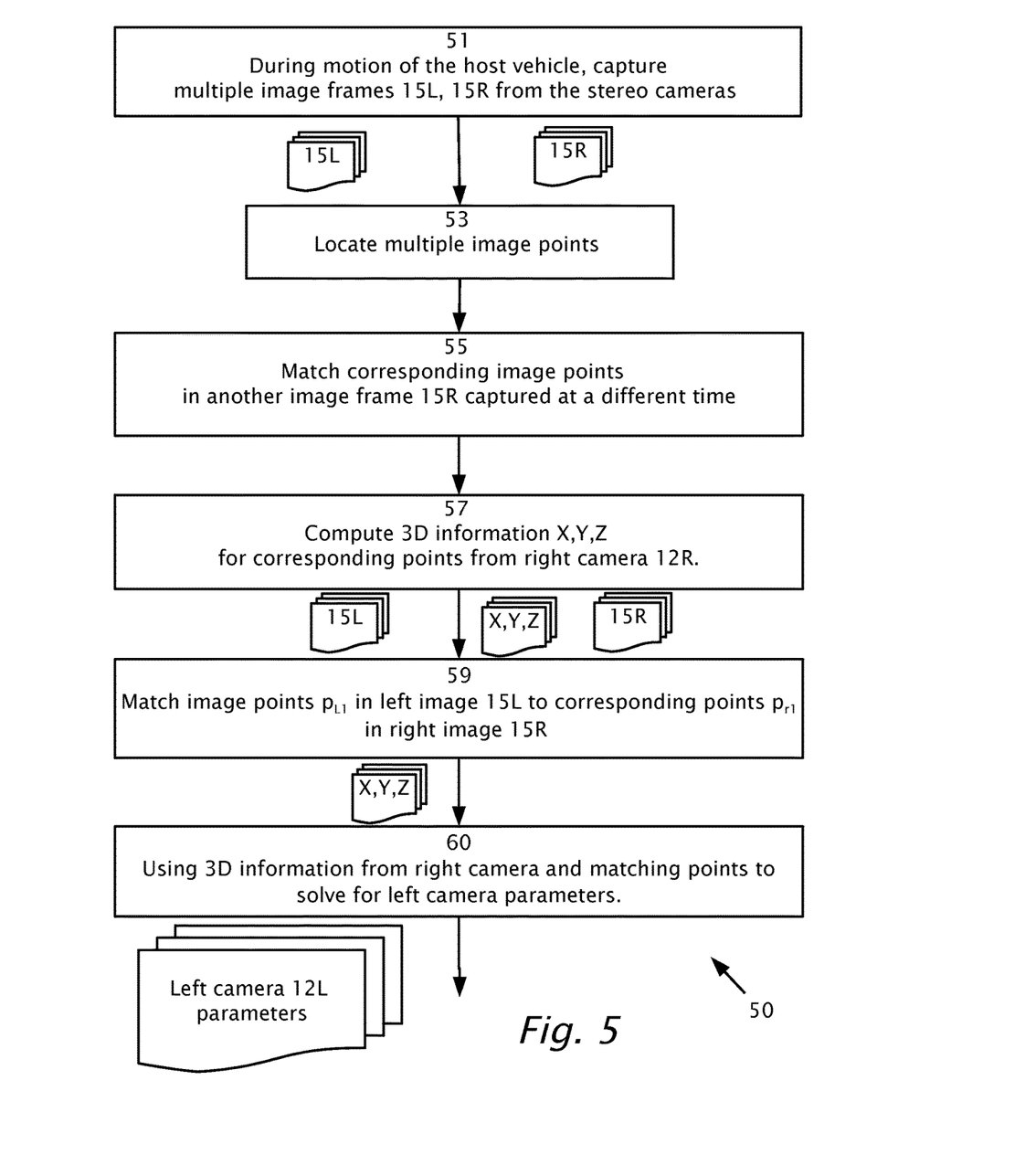
FIG. 5 illustrates a simplified flow chart of a method according to an embodiment of the present invention.

Reference is now made also to FIG. 5, which illustrates a simplified flow chart of a method 50 according to an embodiment of the present invention. Intrinsic parameters of right camera 12R are known or assumed for example from camera manufacturer values. During motion of host vehicle 18 multiple image frames 15L, 15R are captured (step 51) from respective stereo cameras 12L, 12R mounted in host vehicle 18. In step 53, multiple image points or multiple image features are located in an image frame 15R. An example of an image point is a corner which may located for instance by a Harris operator. The same or similar image features are located or matched (step 55) in corresponding image points in another image frame 15R captured from right stereo camera 12R at a second time. There are many methods described in the art for matching image points and image features. Using an SfM algorithm as known in the art, on images captured from right stereo camera 12R, three-dimensional world coordinate information (X,Y,Z) may be computed (step 57) in the world coordinate system of right stereo camera 12R for the object points which were matched (step 55). In step 59, matching image points or features are located in the left camera images 15L corresponding to image points or features in right images 15R. Matching points may be obtained simply by comparing an image patch in the neighborhood of the point in right image 15R to the best matching patch in left image 15L. Projective epipolar constraints may be used in step 59, although the calibrated epipolar geometry has not yet been solved. The world coordinate information (X,Y,Z) of image points as computed (step 57) using SfM in right images 12R are projected onto the left image 12L, and compared to the matching points in the left image frame and the distance minimized to solve (step 60) for the camera parameters of left camera 12L. Step 60 may be performed while varying camera parameters of left camera 12L and when the best solution is found, camera parameters 12L of the left camera are output. Alternatively, a closed form solution (step 60) is determined for the camera projection matrix of the left camera and other camera parameters of the left camera using the 3D points and their 2D image points in the left camera. The left camera parameters can be used to describe the epipolar geometry. A stereo disparity map computed from left and right stereo cameras 12L, 12R results in a depth map consistent with the three-dimensional world coordinate information, e.g depth $Z_r$ computed using SfM with right camera 12R.

Further Embodiments and Features

Matching (steps 55 and 59) has been described as being between sparsely distributed image features and/or points in consecutive images 15R or left 15L/right 15R image pairs. However, image points may be selected which are densely distributed and dense optical flow techniques may be used for the SfM computation (step 57) and/or for computations using stereo pairs with the same general structure. Dense optical flow may be computed between two right images 15R a dense depth map may be computed. Dense optical flow may similarly be computed using respective paired images from stereo cameras 12L, 12R.

The use of right 12R and left 12L stereo cameras is by way of example. In different embodiments the present invention is applicable to stereo cameras relatively displaced forward/rearward and/or displaced vertically such as a stereo pair of a windshield camera and camera installed on a car bumper.

Although the discussion includes modeling of radial distortion, the methods as disclosed herein may be similarly applied to other lens distortion models such as a fish eye lens. However, a closed form solution may not be available for all types of distortion and numerical solution is available.

Consider a windshield and bumper camera pair in which the bumper camera is a wide fish eye camera. It is possible that the objects at the edge of the bumper camera image are not visible in the windshield camera image. However these objects may have been visible in earlier images of the windshield camera when the vehicle was farther from the object. If the three-dimensional position of the object was detected in earlier images of the windshield camera and the objects are matched in earlier images, the objects can be tracked and the three-dimensional position may be updated using ego motion from an SfM computation from images of the bumper camera. The updated three-dimensional positions may then be used at a later image for the calibration of the windshield camera.

A More Formal Description

Method 50 according to embodiments of the present invention is presented more formally and in further detail in the description as follows. Rules of notation in the description as follows are:

Square brackets [ . . . ] are used to denote a matrix. A vector is denoted as a matrix of a single column. Comma may be used to separate columns of a matrix. Semi-colon may be used to separate rows of a matrix. The symbol $\Re$ refers to real space. Points in real space $\Re$ are represented by vectors or matrices of single column. Coordinates in Euclidean or three dimensional (3D) world space are denoted with capital letters, e.g. X,Y,Z. Coordinates in two-dimensional (2D) image space are denoted with small letters, e.g. x,y.

In what follows, it will be convenient to work with homogeneous as well as Euclidean coordinates. In homogeneous coordinates, a point in N-dimensional space is expressed by a vector with N+1 elements that is defined only up to scale, i.e. multiplying the vector by an arbitrary non-zero scale factor will not change its meaning. Provided the N+1'th element is non-zero, a homogeneous coordinate may be related to its Euclidean equivalent by dividing the first N elements by the N+1'th. Otherwise, the coordinate describes a point at infinity.

Calibration Parameters

A 3D world point P=[X;Y;Z] is mapped to a 2D image point p=[x; y] by a 3×4 projection matrix M.

$$[p;1] \simeq M[P;1] \qquad (1)$$

where [p;1] is a 3-vector in homogeneous coordinates in image space, [P;1] is a 4-vector in world space in homogeneous coordinates and $\simeq$ denotes equality up to scale. The matrix M may be further uniquely decomposed into: an intrinsic parameters matrix $A \in \Re^{3\times 3}$, a rotation matrix $R \in \Re^{3\times 3}$ and a translation vector $t \in \Re^{3\times 1}$ as follows:

$$M = A[R,t] \qquad (2)$$

The intrinsic parameters matrix A is a general upper triangular matrix. Given focal length f and principal point $[pp_x, pp_y]$, the intrinsic camera parameters matrix A becomes:

$$A = \begin{bmatrix} f & 0 & pp_x \\ 0 & f & pp_y \\ 0 & 0 & 1 \end{bmatrix} \qquad (3)$$

The distortion of the camera is modeled by a radial distortion. The distortion parameters $\theta = \{c_x, c_y, \alpha_0, \alpha_1\}$ are modeled by a center of distortion point $\tilde{c} = [\tilde{c}_x; \tilde{c}_y]$ and two stretch coefficients $\alpha_0$ and $\alpha_1$. A function F to correct a distortion of a point $\tilde{p}$ is given by:

$$p = F(\tilde{p};\theta) \qquad (4)$$

$$F(\tilde{p};\theta) = (\tilde{p}-\tilde{c})(1+\alpha_0 r^2 + \alpha_1 r^4) + \tilde{c} \qquad (5)$$

where $$r = \|\tilde{p}-\tilde{c}\|_2$$

which is the least squares or $L^2$ norm of the difference between point $\tilde{P}$ and center point $\tilde{C}$.

Taking distortion into account, equation 1 becomes:

$$\lambda[F(\tilde{p};\theta);1)] = M[P;1] \qquad (6)$$

where $\lambda$ is the missing scale factor from equation 1.

For simplicity of notation the above equation may be written in the following manner:

$$F(\tilde{p},\theta) = \text{dehom}(M \cdot \text{hom}(P))$$

$$\text{hom}(p) = [p;1]$$

$$\text{dehom}(\lambda[p;1]) = p \qquad (7)$$

where the function hom denotes a conversion from Euclidean coordinates to homogeneous coordinates and the function dehom denotes a conversion from homogeneous coordinates back to Euclidean coordinates.

The Algorithm

In automotive applications, the baseline is relatively small and the objects relatively distant. As a result image disparity is quite small. As a result, feature points in the right image can be matched to points in the left image using image tracking such as the Lucas-Kanade method or exhaustive search for a similar patch between the two images in a small search region. In the case of larger potential disparities, scale-invariant feature transform (SIFT) features may be used to assist in the matching. Many other methods for point matching are known in the art.

Let $\tilde{p}_r, \tilde{p}_l \in \Re^2$ denote a pair of matching points in the right and left images, captured by the right and left stereo cameras, respectively. Let $Z_r \in \Re^2$ denote the depth value related to the matching point $P_r$ as computed by a mono or single camera structure-from-motion (SfM) algorithm. The intrinsic parameter matrices of the right camera $A_r$, as well as the distortion parameters $\theta_r$ and $\theta_l$ of right and left cameras respectively are initialized to the default parameters of the camera manufacturer.

Camera Matrix Initialization

From the known motion of the cameras, depth $Z_r$ is computed using the structure-from-motion (SfM) algorithm. Thus, the world coordinate system is defined to be the coordinate system of the right camera with no rotation nor translation:

$$M_r = A_r \begin{bmatrix} 1 & 0 & 0 & 0 \\ 0 & 1 & 0 & 0 \\ 0 & 0 & 1 & 0 \end{bmatrix} \qquad (8)$$

Intrinsic parameters matrix $A_r$ and distortion parameters $\theta_r$ of the right camera are used to compute the world point P from the distorted image point $\tilde{p}_r$ and the depth $Z_r$, which is computed by the SFM algorithm. Specifically, the vector direction $V_r$ of the distorted image point $\tilde{p}_r$ is given by:

$$V_r = A_r^{-1} \text{hom}(F(\tilde{p}_r, \theta_r)) \qquad (9)$$

And given the depth $Z_r$ we have the vector of the world point $P_r$ corresponding to the distorted image point $\tilde{p}_r$ in the image of the right camera:

$$P_r = \frac{Z_r}{V_{rz}} V_r \qquad (10)$$

Now, we wish to recover the left camera projection matrix $M_1$ given the 3D points $P_r$, in the world coordinate system, and their corresponding undistorted image points, $[x,y]=F(\tilde{p}_l, \theta_l)$ in the coordinate system of the left camera. The equations take the following form:

Let $M_l=[m_{l0}^T; m_{l1}^T; m_{l2}^T]$ where $m_{li}$ denotes the i-th row of matrix $M_l$.

We have $x=(m_{l0}^T P)/(m_{l2}^T P)$ and $y=(m_{l1}^T P)/(m_{l2}^T P)$

From which we obtain:

$$m_{l0}^T P - x \cdot m_{l2}^T P = 0 \quad (11)$$

$$m_{l1}^T P - y \cdot m_{l2}^T P = 0 \quad (12)$$

We use least square solution to these equations to solve the left camera matrix: $M_l$. We combat outliers by using RANSAC. In each round we sample 6 points, and solve the camera matrix $M_l$ using Equations (11) and (12). The score for a solution in each round is computed as follows: The distance of the warped projected world point from the matched image point is:

$$dist_i = \|\tilde{p}_{l2} - F^{-1}(dehom(M_l \cdot hom(P_i)), \theta_l)\|_2 \quad (13)$$

A simple score that we can define for each model is:

$$score = \sum_i \min(dist_i, \tau)^2 \quad (14)$$

where $\tau$ is a specified threshold on the error of inlier points. Alternatively, we use the following score:

$$score = \sum_i \sqrt{\tau^2 - \max(\tau - dist_i, 0)^2} \quad (15)$$

The score defined in Equation (15) has the advantage that inliers that have high distance, which are more likely to be outliers, have less impact on the score, thus the final parameters are likely to be more accurate.

Camera Matrix and Distortion Correction Initialization

We compute the distance error specified by Equation (13), and using a predefined threshold we determine which points pair are inliers.

Given the inliers we re-compute the parameters of the left camera, without using the computed camera matrix M as an initial guess. The only input that we use is an initial guess to distortion center. The algorithm in this section is divided into two steps. In the first step we have a non linear estimation of the distortion center. In the second step we efficiently estimate the rest of the calibration parameters.

The camera matrix $\hat{M}$ that is recovered by these steps is relative to a given distortion center: $[c_x; c_y]$. That means that projection model is:

$$p_l - [c_x; c_y] = dehom(\hat{M} \cdot hom(P)) \quad (16)$$

Once we reveal the camera matrix we can modify it to be relative to the image:

$$M = \begin{bmatrix} 1 & 0 & c_x \\ 0 & 1 & c_y \\ 0 & 0 & 1 \end{bmatrix} \hat{M} \quad (17)$$

We now describe how we compute an error score for the non linear search, given the distortion center. Let $[c_x; c_y]$ be the distortion center. Let $$[\tilde{x}; \tilde{y}] = \tilde{p}_l - [c_x; c_y]$$

be the distorted point in the left image, relative to the distortion center. We seek for camera matrix $\hat{M}$ which is relative to the distortion center thus the vector $$[x; y] = dehom(\hat{M} \cdot hom(P))$$

is the projected point relative to the distortion center, and as a result it is a scale of the vector $$[\tilde{x}; \tilde{y}]$$

Thus we can define a linear equation over two rows of the camera matrix:

$$\hat{M} = [m_0^T; m_1^T; m_2^T];$$

$$\hat{M} \cdot hom(P) = \lambda \cdot hom([\tilde{x}; \tilde{y}])$$

$$(m_0^T \cdot hom(P))/(m_1^T \cdot hom(P)) = \tilde{x}/\tilde{y}$$

And we have the linear equation:

$$m_0^T \cdot hom(P) \cdot \tilde{y} - m_1^T \cdot hom(P) \cdot \tilde{x} = 0 \quad (18)$$

After we solve $m_0$ and $m_1$, we can define a simple error function by computing the distance of the point $(\tilde{p}_l - c)$ from the ray defined by $v = [m_0^T; m_1^T] \cdot hom(P)$:

$$dist = \left\| \left( I - \frac{v \cdot v^T}{\|v\|^2} \right) (\hat{p}_l - c) \right\| \quad (19)$$

The error that is defined by Equation (15), is minimized by non linear optimization to obtain the distortion center $[c_x; c_y]$.

Complete Parameters Estimation

The input to this step are the inliers points: P and $\tilde{p}l$ the center of distortion $[c_x; c_y]$, and two rows of the camera matrix: $m_0$ and $m_1$. The output of this step is the third row of the camera matrix $m_2$, and the distortion stretch coefficients: $\alpha_0$ and $\alpha_1$. See equation (5).

Recall that $\hat{M}$ is relative to the distortion center, thus from equations (5) and (7) we have that:

$$[\tilde{x}; \tilde{y}](1 + \alpha_0 r^2 + \alpha_1 r^4) = dehom(\hat{M} \cdot hom(P)) \quad (20)$$

so we get two equations for each pair of points:

$$\tilde{x}(1 + \alpha_0 r^2 + \alpha_1 r^4)(m_2^T P) = m_0^T P$$

$$\tilde{y}(1 + \alpha_0 r^2 + \alpha_1 r^4) m_2^T P = m_1^T P$$

Where we have 6 unknowns: The 4 unknowns of $m_2$, and the 2 unknowns $\alpha_0$ and $\alpha_1$. These equations are not linear and instead we solve linearly for the following 12 unknowns:

$$[m_2^T; \alpha_0 m_2^T; \alpha_1 m2^T] \quad (21)$$

$$[U, D, V] = svd\left( \begin{bmatrix} b_0 & b_1 & b_2 & b_3 \\ b_4 & b_5 & b_6 & b_7 \\ b_8 & b_9 & b_{10} & b_{11} \end{bmatrix} \right)$$

Once we have the solution vector: $b \in \mathfrak{R}^{12}$ we decompose it using Singular Value Decomposition (SVD):

The solution to the 6 parameters: $m_2$, and $\alpha_0$ and $\alpha_1$, can be taken using the highest singular value and its related singular vectors:

$$U_0 D_0 V_0^T = [1; \alpha_0; \alpha_1] m_2^T \quad (22)$$

4.4 Refine Camera Parameters

We refine the parameters of the left camera using non linear optimization. The optimizer minimizes the same score define in Equation (15).

Note that we optimize only the left camera parameters, and use the right camera parameters as they were given in the initialization step. There is also the option to refine the right camera parameters, but this option is more expensive to compute.

Correction for Distortion Caused by Rolling Shutter Cameras

The cameras that we use have a rolling shutter effect. That means that rows of camera are not captured at the same time, but captured is performed row after row. In order to perform auto calibration for this type of camera we fix the input to the algorithm in the following manner. The Structure From Motion (SfM) algorithm computes the depth of each pixel. In equation (10) we called this depth $Z_r$. The depth reported by SfM is a depth at specific time related to the image, such that the depths of all pixels are generated for an imaginary image without the effect of rolling shutter. We do not use this depth. Instead we use a depth that is also computed by SfM algorithm, which is the depth at the time when the pixel was actually captured. Let us call this depth $\hat{Z}_r$. Otherwise, the equation as follows has the same form as equation (10):

$$\hat{P}_r = \frac{\hat{Z}_r}{V_{rz}} V_r \quad (23)$$

The world point $\hat{P}_r$ is related to time when the pixel was actually captured. This world point is still not the correct world point to use. The problem is that due the rolling shutter, and the inability of generating perfectly aligned stereo cameras, the stereo camera are actually not perfectly synchronized, and thus the world point $\hat{P}_r$ is not the point that is projected to $p_l$. In order to fix it we use another output from SfM, the ego motion matrix T=[R, t] that maps point from previous image to current image:

$$P_c = R \cdot P_p + t \quad (24)$$

Where $P_c$ and $P_p$ are the coordinates of a stationary point relative to the current and previous coordinate systems respectively.

Let $\Delta_{SFM} = t_c - t_p$ be the time elapsed between previous image and current image used by the SfM. $t_c$ and $t_p$ are the times related to current and previous images respectively, in seconds.

Let $\Delta_{stereo} = t_l - t_r$ be the time discrepancy between left and right stereo images, due to non perfect synchronization. $t_l$ and $t_r$ are the times related to left and right stereo images respectively, in seconds.

We can fix the world point $$P_r = dehom\left( T^{\frac{\Delta_{stereo}}{\Delta_{SFM}}} \cdot hom(\hat{P}_r) \right) \quad (25)$$

that is related to time when the pixel in the right image was captured, to be a world point $P_r$ that is related to the time when the matching pixel in the left image was captured as follows:

Where $$T = \begin{bmatrix} R & t \\ 000 & 1 \end{bmatrix}$$

The world point $P_r$ defined by equation (25), replaces the world point $P_r$ defined by equation (10). The rest of the auto calibration algorithm remains unchanged.

The term "object" as used herein refers to an object in real space being viewed by a camera. A curb along the edge of a road and a lane marker in the road are examples of objects. The term "image" refers to the image of one or more objects in image space at the focal plane of camera 12. Image coordinates (x,y) in small letters refer to image space and may be in arbitrary units or numbers of picture elements in the horizontal and vertical directions with the pixel dimensions assumed. The term "image motion" refers to motion of an image of an object in image space. From image frame 15 to a subsequent image frame 15 the points of the image of the object may map from one set of coordinates (x1,y1) to a different set of coordinates (x2,y2). The term "image motion" refers to the mapping of coordinates of an image from image frame to image frame or a function of the mapping.

The term "projection" or "projecting" as used herein refers to camera or perspective projection from three dimensional space to a two dimensional image unless otherwise indicated by the context.

A "depth map" as used herein is an image that contains information relating to the world space distance of object points of scene objects from a viewpoint.

Image points in the stereo images of the same world object point or feature are known herein as "corresponding" or "matching" points.

The indefinite articles "a" and "an" is used herein, such as "a camera", "an image frame" have the meaning of "one or more" that is "one or more cameras" or "one or more image frames".

Although selected embodiments of the present invention have been shown and described, it is to be understood the present invention is not limited to the described embodiments. Instead, it is to be appreciated that changes may be made to these embodiments, the scope of which is defined by the claims and the equivalents thereof.

What is claimed is:

1. A computer implemented method for auto-calibration of a camera of a host vehicle, the method comprising the following operations performed by one or more processors:
   receiving, from a first camera, a first image and a second image, the first and second images including an environment of the host vehicle;
   receiving, from a second camera, a third image including the environment of the host vehicle;
   identifying a first image point corresponding to a feature in the first image and a second image point corresponding to the feature in the second image;
   determining a three-dimensional coordinate of the feature based on a motion parameter of the host vehicle and a comparison of the first image point and the second image point;

determining a third image point corresponding to the feature in the third image; and determining at least one calibration parameter of the second camera based on the three-dimensional coordinate of the feature and the third image point.

2. The method of claim 1, further comprising:

identifying a fourth image point corresponding to a second feature in a fourth image received from the first camera and a fifth image point corresponding to the second feature in a fifth image received from the second camera; and determining a three dimensional coordinate of the second feature based on the calibration parameter of the second camera and a calculated stereo disparity between the fourth image and the fifth image.

3. The method of claim 1, wherein the feature in the first and second image includes an object in the environment of the host vehicle.

4. The method of claim 1, wherein at least one of the first and second cameras faces a windshield of the host vehicle.

5. The method of claim 1, wherein the first and second cameras are displaced from each other relative to a forward or rearward placement on the host vehicle.

6. The method of claim 1, wherein the first and second cameras are displaced from each other relative to a left side and a right side placement on the host vehicle.

7. The method of claim 1, wherein the first and second cameras are displaced from each other relative to a vertical placement on the host vehicle.

8. The method of claim 1, wherein the calibration parameter is representative of a distortion of a lens of the second camera.

9. The method of claim 1, wherein the motion parameter of the host vehicle is indicative of ego motion of the host vehicle.

10. The method of claim 1, wherein the first and second cameras include a rolling shutter, and the method further comprises:

adjusting the three-dimensional coordinate of the feature based on a time when the third image was captured.

11. The method of claim 10, wherein the adjustment of the three-dimensional coordinate is further based on a motion of the host vehicle.

12. A system for auto-calibration of a camera of a host vehicle, the system comprising:

at least one processor programmed to:

receive, from a first camera, a first image and a second image, the first and second images including an environment of the host vehicle;

receive, from a second camera, a third image including the environment of the host vehicle;

identify a first image point corresponding to a feature in the first image and a second image point corresponding to the feature in the second image;

determine a three-dimensional coordinate of the feature based on a motion parameter of the host vehicle and a comparison of the first image point and the second image point;

determine a third image point corresponding to the feature in the third image; and determine at least one calibration parameter of the second camera based on the three-dimensional coordinate of the feature and the third image point.

13. The system of claim 12, wherein the processor is further programmed to:

identify a fourth image point corresponding to a second feature in a fourth image received from the first camera and a fifth image point corresponding to the second feature in a fifth image received from the second camera; and determine a three dimensional coordinate of the second feature based on the calibration parameter of the second camera and a calculated stereo disparity between the fourth image and the fifth image.

14. The system of claim 12, wherein the feature in the first and second image includes an object in the environment of the host vehicle.

15. The system of claim 12, wherein at least one of the first and second cameras faces a windshield of the host vehicle.

16. The system of claim 12, wherein the first and second cameras are displaced from each other relative to a forward or rearward placement on the host vehicle.

17. The system of claim 12, wherein the first and second cameras are displaced from each other relative to a left side and a right side placement on the host vehicle.

18. The system of claim 12, wherein the first and second cameras are displaced from each other relative to a vertical placement on the host vehicle.

19. The system of claim 12, wherein the calibration parameter is representative of a distortion of a lens of the second camera and the motion parameter of the host vehicle is indicative of ego motion of the host vehicle.

20. The system of claim 12, wherein the first and second cameras include a rolling shutter, and wherein the processor is further programmed to:

adjust the three-dimensional coordinate of the feature based on a time when the third image was captured.

21. A non-transitory computer-readable storage medium that comprises instructions that are executable by at least one processor to cause the at least one processor to perform a method for auto-calibration of a camera of a host vehicle, the method comprising:

receiving, from a first camera, a first image and a second image, the first and second images including an environment of the host vehicle;

receiving, from a second camera, a third image including the environment of the host vehicle;

identifying a first image point corresponding to a feature in the first image and a second image point corresponding to the feature in the second image;

determining a three-dimensional coordinate of the feature based on a motion parameter of the host vehicle and a comparison of the first image point and the second image point;

determining a third image point corresponding to the feature in the third image; and determining at least one calibration parameter of the second camera based on the three-dimensional coordinate of the feature and the third image point.

* * * * *